May 1, 1923.
T. A. CROTTY
1,453,380
VEHICLE SIGNAL
Filed Oct. 21, 1922
3 Sheets-Sheet 1
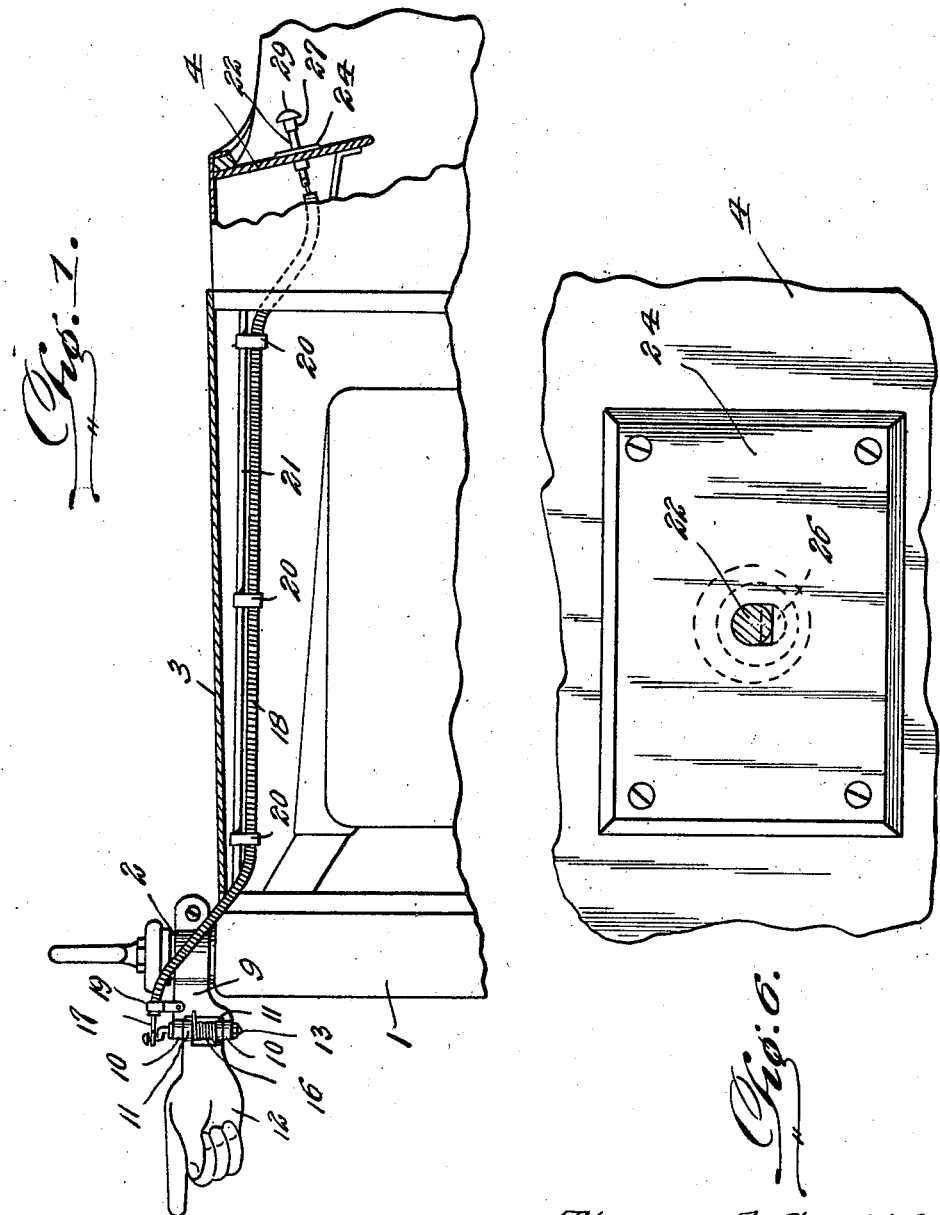
Witnesses:
F. L. Fox,
H. Berman
Thomas A. Crotty,
INVENTOR.
BY Clarence A. O'Brien
ATTORNEY.

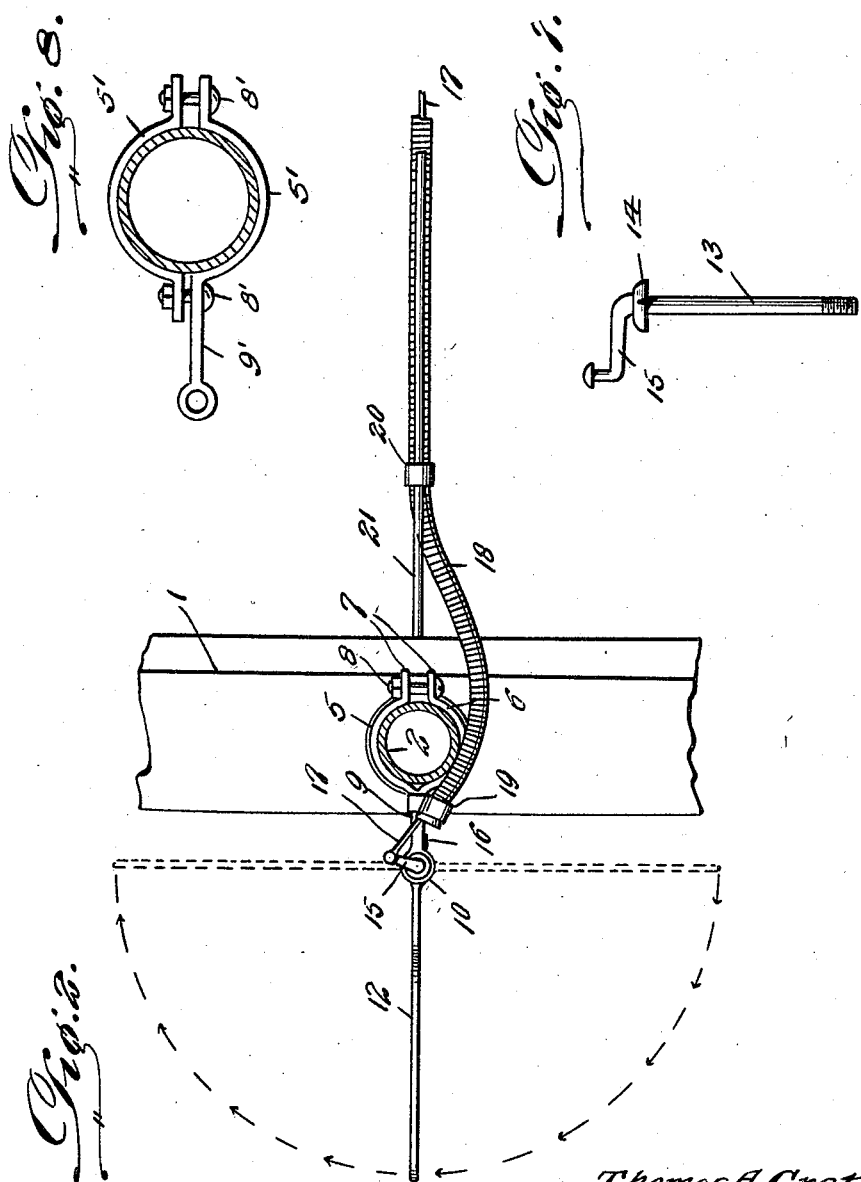

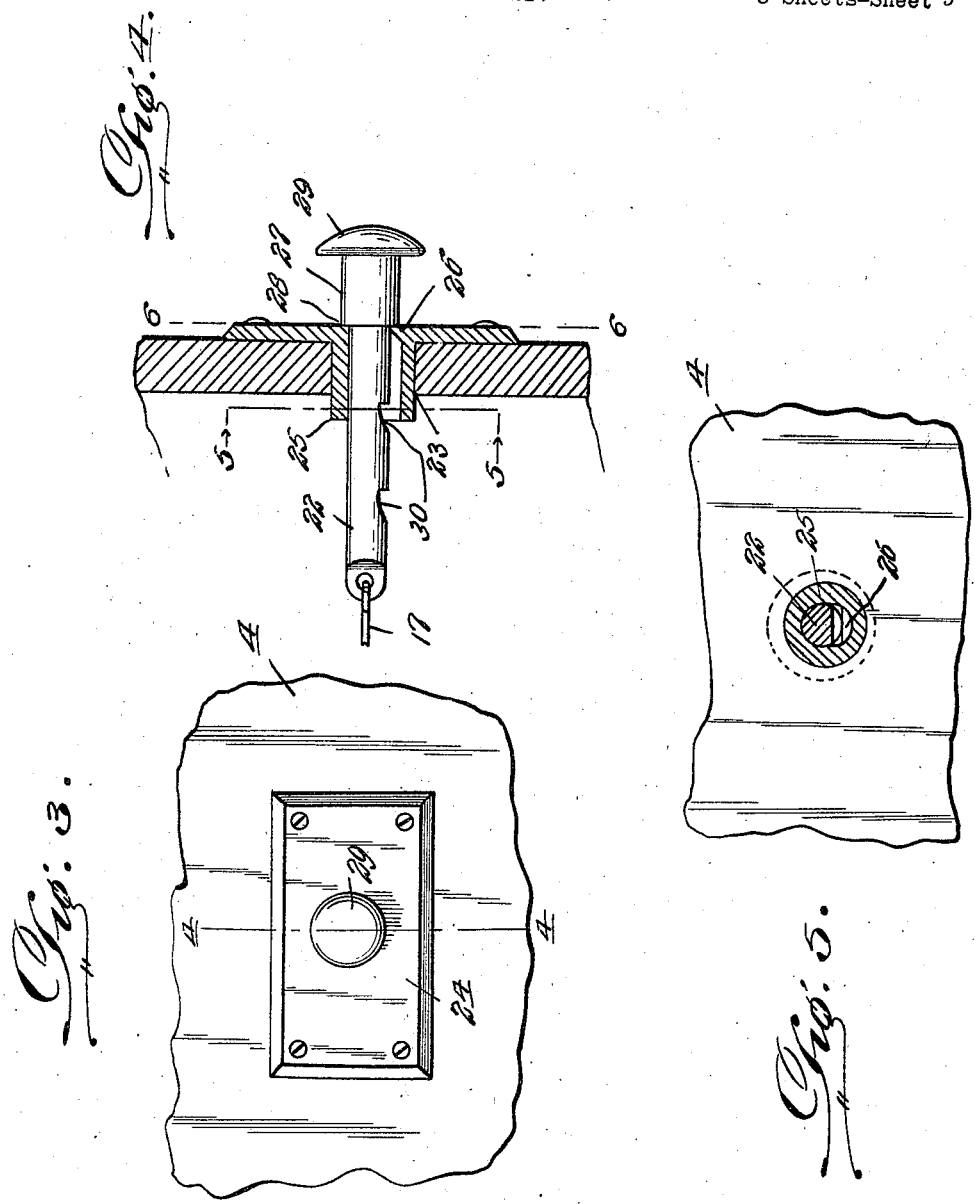

Patented May 1, 1923.

1,453,380

UNITED STATES PATENT OFFICE.

THOMAS A. CROTTY, OF DANBURY, CONNECTICUT.

VEHICLE SIGNAL.

Application filed October 21, 1922. Serial No. 595,910.

*To all whom it may concern:*

Be it known that I, THOMAS A. CROTTY, a citizen of the United States, residing at Danbury, in the county of Fairfield and State of Connecticut, have invented certain new and useful Improvements in Vehicle Signals, of which the following is a specification.

The present invention relates to improvements in vehicle signals, and has for the primary object thereof, the provision of a signalling arm carried by the water filling nozzle of an automobile radiator and adapted to be controlled by the driver of the vehicle for indicating to a traffic officer or pedestrians forwardly of the vehicle, the intention of the driver thereof to make a right or left turn.

A further object of the invention resides in the provision of such a device that is of simple construction, inexpensive of manufacture, and highly efficient of purpose.

With these general objects in view, and others that will appear as the nature of the invention is better understood, the same consists in the novel construction, combination, and arrangement of parts hereinafter more fully described, illustrated in the accompanying drawings, and pointed out in the appended claim.

In the drawings forming a part of this application, and in which like designating characters refer to corresponding parts throughout the several views:—

Figure 1 is a longitudinal sectional view of the forward portion of a motor vehicle, showing my improved direction signal in position thereon.

Figure 2 is a fragmentary top plan view of the indicating arm, and a portion of the operating means therefor.

Figure 3 is a front elevational view of a plate member secured at a convenient position upon the instrument board adapted to have the signal operating knob projecting therethrough.

Figure 4 is a vertical cross sectional view upon the line 4—4 of Figure 3.

Figure 5 is a vertical cross sectional view upon the line 5—5 of Figure 4, and looking in the direction of the arrows.

Figure 6 is a similar view upon the line 6—6 of Figure 4.

Figure 7 is a side elevational view of the connecting bolt for the indicating arm, and Figure 8 is a modied form of clamp pivotally connecting the indicating arm to the filling spout of the vehicle radiator.

Referring to the drawings, there is shown in several of the figures, a portion of a motor vehicle including a radiator 1, annular filling spout 2, hood 3 and instrument board 4.

Positioned upon the filling spout 2, is a clamp member consisting of side plates 5 and 6, the inner ends of which are right angularly bent for presenting spaced fingers 7, having alined perforations therein for receiving therebetween a bolt and fastener 8. Formed upon the front ends of the side members 5 and 6 of the clamp is a forwardly projecting arm portion 9 having spaced perforated fingers 10 formed thereon. Adapted for positioning upon these spaced fingers 10 are other centrally perforated spaced fingers 11 of an indicating hand 12. Extending through the perforations in the spaced fingers of the indicating hand 12, and arm 9 is a pivot bolt 13 screw threaded at one end for the reception of a securing nut as shown. Referring particularly to Figure 7, it will be seen that this pivot bolt 13 has an annular shoulder 14 adjacent the upper end thereof for contact upon the surface of the upper finger 10 of the arm portion 9 of the clamp and the extreme upper portion of this bolt is cranked as at 15 for a purpose hereinafter described. Surrounding the bolt 13 and between the spaced fingers 11 of the indicating hand 12 is a relatively strong coiled spring 16, the opposite ends of which are secured to an indicating hand 12 and arm portion 9 for normally tending to extend the indicator to a position towards the left as shown in dotted lines in Figure 2. Loosely secured to the end of the crank portion 15 of the pivot bolt 13 is a flexible operating wire 17, and this wire 17 is adapted to extend through a flexible tube 18, which tube is supported at its outer end within a clamp 19 rigidly secured to the forwardly projecting arm 9 and similarly secured by other clamps 20 carried by a longitudinally extending rod 21 beneath the hood 3 of the vehicle.

With reference to Figure 4, the flexible wire 17 is connected at its opposite end to an angular shaped operating rod 22 extending through an opening 23 in the instrument board. Positioned upon the instrument board is a rectangular shaped plate 24 centrally perforated and having a rearwardly extending sleeve 26 positioned through the opening 23 in the instrument board. The central perforation in the plate 24, and the bore of the sleeve 25 are of oblong configuration, and are adapted to have the operating rod 22 extend therethrough. The lower end of the central perforation of the plate 24 is so formed as to provide a transversely extending lip portion 26 and across the rod 22 is enlarged as at 27 for presenting an annular shoulder 28 to the walls of the central perforation in the plate 24, the extreme outer end of this rod being headed as at 29. The underside of the rod 22 has a pair of spaced notches 30 therein for selectively engaging over the said lip portion 26 of the plate 24 in a manner hereinafter described.

In Figure 8, I have shown a slightly modified form of clamp member for securing the indicating hand to the filling spout 2 of the radiator 1, and this clamp comprises a pair of clamping plates 5' joined at their opposite ends by bolt and nut connections 8', and the forward end of one of these sections 5' has formed thereon a forwardly projecting arm 9' similar to the arm 9 of the previously described clamp.

In view of the above description, it will be understood that the normal position of the indicating hand 12 is towards the left as shown by the dotted lines in Figure 2, this normal position being occasioned by the coiled spring 16 positioned around the bolt 13. In this normal position of the indicating hand 12, the operating rod 22 will be in a position as shown in Figure 4. The normal position of the hand 12 while running is however, as shown by the full lines of Figure 2, and this position is occasioned by pulling the rod 22 for engaging the first notch upon the lip 26. For swinging the indicating hand 12 to the right hand position as by the dotted lines in Figure 2, for indicating a right hand turn, the rod 22 is further pulled out for engaging the next notch 30 upon the lip 26.

From the above description it will be apparent that I have produced a signal for motor vehicles that is at all times under direct control of the operator thereof, and such a signal that will clearly indicate to a traffic officer the intention of the driver to make a right or left turn.

What I claim as new is:—

In a signal for motor vehicles, a clamp secured to the water filling spout of the vehicle, and having a forwardly projecting arm formed thereon, an indicating hand pivotally secured to the arm of the clamp by a vertically extending bolt member having a cranked upper portion, a flexible wire secured at one end to the crank portion of the bolt and secured at its opposite end to an operating rod for the indicating hand, the said rod adapted to extend through a plate secured to the instrument board of the vehicle and having a forwardly projecting sleeve portion received within an opening in the instrument board, spaced notches formed upon the operating rod and adapted for selective engagement with a transversely extending lip formed upon the said plate for retaining the indicating arm in certain set positions.

In testimony whereof I affix my signature.

THOMAS A. CROTTY.